Patented Oct. 4, 1949

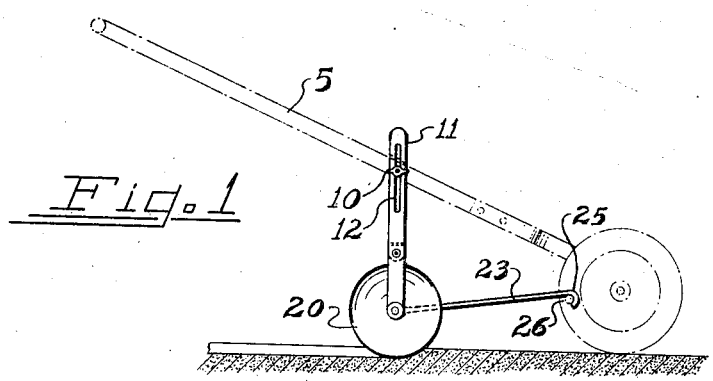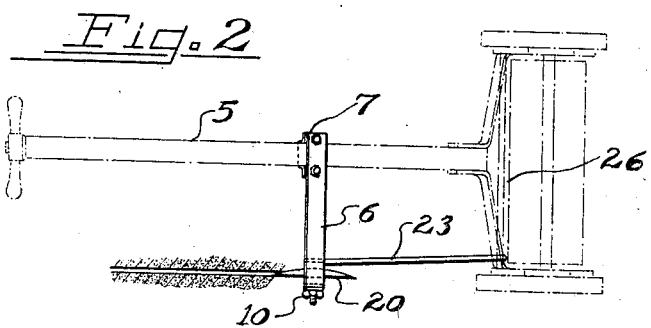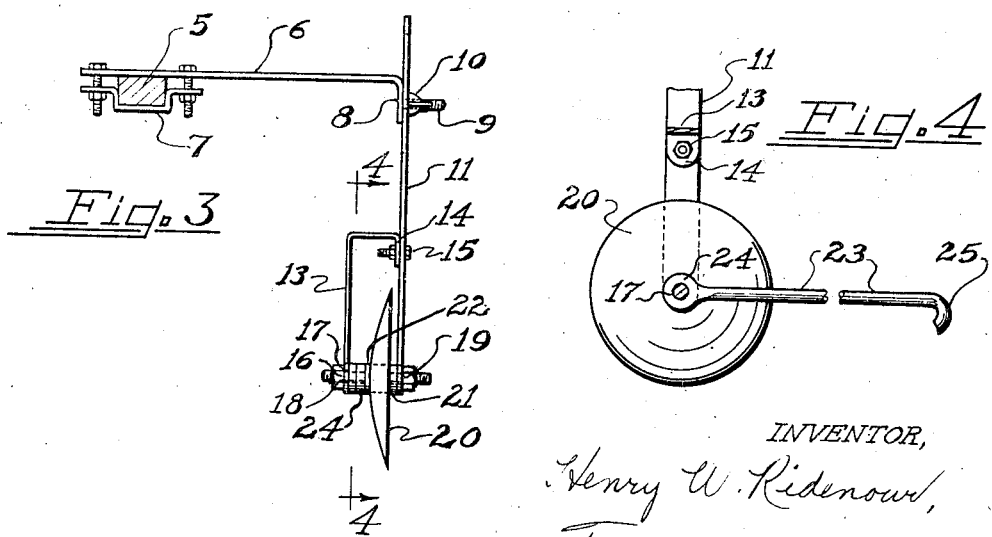

2,483,935

UNITED STATES PATENT OFFICE 2,483,935

EDGE TRIMMING ATTACHMENT FOR LAWN MOWERS

Henry W. Ridenour, Bloomington, Ill.

Application March 10, 1947, Serial No. 733,634

1 Claim. (Cl. 56—251)

This invention relates to lawn trimmers or edge cutters, and particularly to an equipment for cutting the edges of lawns where they merge with sidewalks or the like, though, of course it is susceptible of use in many different phases of lawn treatment, and preferably the device is an attachment to be employed in association with lawn mowers of the conventional type.

An object of this invention is to produce a device which will be hereinafter referred to as a trimmer or a lawn trimming device, although it is more particularly employed as an edger to produce an even line for the edge of the lawn and for cutting grass or the like that may project over an edge of a walk.

It is a further object of the invention to provide an attachment having novel means for mounting it on a handle of a lawn cutter, the said device being adjustable to project a distance laterally of a handle of a lawn mower, and means are provided furthermore for adjusting a standard on which the knife is rotatably mounted so that the knife will act when the handle is in different inclinations with respect to the surface being treated.

It is a still further object of the invention to provide a lawn trimmer of the character indicated in which a beam is attachable to a lawn mower handle, means being associated with the beam for mounting the knife, which is preferably a rotary disk cutter, the said parts being strong and durable and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 1 illustrates a view in side elevation of a lawn mower with a device embodying the invention applied thereto;

Figure 2 illustrates a top plan view thereof;

Figure 3 illustrates an enlarged detail view of the lawn trimmer attached to the handle of the lawn mower; and Figure 4 illustrates a detail view of portions of the assembly at the lower end of the standard.

In these drawings 5 denotes a handle of a lawn mower, 6 a beam which is secured on the said handle by clips 7 of conventional type, it being the purpose of the inventor that these clips shall be readily manipulatable so that the beam may be adjusted to different positions longitudinally of the handle.

The end of the beam has a depending arm 8 provided with a bolt 9 on which a thumb-screw 10 is adjustable, and a standard 11 having a longitudinally disposed slot 12 is slidable on the arm with the bolt projecting through the slot, and it is obvious that the standard may be raised or lowered on the arm so that it will extend a variable distance below the beam, it being understood that the standard will be clamped on the arm through the use of the thumb-screw, thus affording a convenient and speedy means of adjusting the said standard.

A bracket 13, preferably of metal, has an angularly disposed end 14, and a bolt 15 extends through an aperture of the angularly disposed portion and through the standard, and by this means the upper part of the bracket is secured to the standard. The lower end of the bracket terminates at approximately the end of the standard and it has an aperture 16 to receive a spindle or bolt 17 which extends through an aperture 18 in the lower end of the bracket and through an aperture 19 in the lower end of the standard. A circular knife or disk 20 is rotatably mounted on the spindle or shaft and it is held spaced from the bracket and standard by collars 21 and 22 interposed between the said knife and the bracket and standard, respectively. In construction, the parts may be supplied with suitable anti-friction elements, but as they are well known mechanical features, it is believed unnecessary for an understanding of the invention to show them in detail.

From an inspection of the drawing, it is obvious that the device comprises comparatively few, inexpensive parts, and the manner of assembling the standard, bracket and parts which they carry, results in a durable construction.

As a means for strengthening the structure and making the standard and the parts more rigid, a brace rod 23 has one end 24 connected to the spindle, and the other end 25 connected to a rod 26 that is carried by the lawn mower.

I claim:

In an edge trimming device adapted to be attached to lawn mowers, a beam adapted to be adjustably secured to the lawn mower handle and having a depending arm at the free end thereof, a vertical standard having a longitudinally extending slot adjacent to the upper end thereof, a fastening element extending through the arm and said slot for supporting the standard at different positions of adjustment, a bracket secured to the standard and having a portion extending outwardly therefrom at right angles to the standard and in parallel relation to the beam, and an integral portion on the said bracket extending in parallel relationship to the standard and terminating at approximately the end of the standard, a spindle journalled in said integral portion and standard, a cutting disk rotatably mounted on the spindle, and spacing elements on said spindle between the said integral portion and disk and between the disk and standard to maintain the cutting disk in operative relation to the assembled parts.

HENRY W. RIDENOUR.

REFERENCES CITED

The following references are of record in the file of this patent:

UNITED STATES PATENTS

| Number | Name | Date |
|---|---|---|
| 1,000,028 | Lindsey | Aug. 8, 1911 |
| 1,249,385 | Hamman | Dec. 11, 1917 |
| 1,561,823 | Bishop | Nov. 17, 1925 |
| 1,720,169 | Cripe | July 9, 1929 |
| 2,270,649 | Corley | Jan. 20, 1942 |